(12) United States Patent
Yoshikawa

(10) Patent No.: US 7,403,303 B2
(45) Date of Patent: Jul. 22, 2008

(54) PRINTING SYSTEM AND PRINTING METHOD

(75) Inventor: Naohiro Yoshikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 810 days.

(21) Appl. No.: 10/777,050

(22) Filed: Feb. 13, 2004

(65) Prior Publication Data

US 2004/0160633 A1 Aug. 19, 2004

(30) Foreign Application Priority Data

Feb. 18, 2003 (JP) ............................. 2003-040047

(51) Int. Cl.
*G06F 3/12* (2006.01)
(52) U.S. Cl. ...................... 358/1.15; 358/406; 358/504
(58) Field of Classification Search ................ 358/1.12, 358/1.15, 406, 504; 347/17, 18, 189; 709/201
See application file for complete search history.

(56) References Cited

U.S. PATENT DOCUMENTS

2001/0026693 A1* 10/2001 Sasai ........................... 399/44
2002/0149799 A1* 10/2002 Hayashi ...................... 358/406

FOREIGN PATENT DOCUMENTS

JP 5-19581 1/1993
JP 5-260302 10/1993

* cited by examiner

*Primary Examiner*—King Poon
*Assistant Examiner*—Nathan K Tyler
(74) *Attorney, Agent, or Firm*—Fitzpatrick, Cella, Harper & Scinto

(57) ABSTRACT

The present invention provides a printing system and a printing method that avoids interrupting a printing process in order to execute a calibration process, while stably reproducing colors. A second printer includes a printing engine having a temperature sensor, a density sensor, and a density sensor and a print controller which acquires information from the various sensors in the printing engine to provide calibration process information to a first printer. The print controller includes a density converted characteristic generating section that converts output density values corresponding to density values inputted to the first printer so that the output density values exhibit an ideal characteristic. The density converted characteristic information generating section generates density converted characteristic information. The first printer receives the density converted characteristic information and executes a printing process while carrying out a density conversion.

2 Claims, 6 Drawing Sheets

PRINTING SYSTEM AND PRINTING METHOD

This application claims priority from Japanese Patent Application No. 2003-040047 filed Feb. 18, 2003, which is incorporated hereinto by reference.

BACKGROUND OF THE INVENTION

1. Field of the Invention

The present invention relates to a printing system and a printing method, and more specifically, to a printing system composed of a plurality of printing apparatuses connected together so as to communicate with each other and computer apparatuses, as well as a printing method.

2. Description of the Related Art

Printing apparatuses constituting a conventional printing system, particularly those which carry out color printing commonly incorporate a function to control printing so as to achieve constant color reproduction for printed matter. This function is generally called a calibration process. An object of the calibration process is to control printing so that three-color or four-color print ink or toner used for printing exhibits a constant gradation characteristic.

Now, description will be given of the reason why the calibration process is required for a printing apparatus to which what is called an electrophotographic process is applied, for example, a laser printer (hereinafter referred to as an LBP).

Electrophotography commonly uses a print processing system that basically executes a procedure to irradiate a photosensitive member with laser light to form an electrostatic latent image allowing charged toner (powdery ink) to adhere to the electrostatic latent image for development, transferring this image to a sheet, and using heat and pressure to fix the image to the sheet. Color LBPs or copiers use a method of using three-color toner (yellow, magenta, and cyan; these colors are often represented as YMC) or four-color toner (yellow, magenta, cyan, and black; these colors are often represented as YMCK or YMCB. The present invention uses the YMCK expression. In the following description, the color LBP is assumed to execute printing in four-colors including Y, M, C, and K. However, the present invention is obviously effective on color LBPs that execute color printing in three-colors) to draw an image, forming this image on a surface of an intermediate transfer member, and transferring the image to a sheet for fixation.

In this electrophotographic process, the factors of variations in gradation characteristic include environmental temperature and humidity. Variations in environmental temperature or humidity affect the electrophotographic process as described below.

1) The environmental temperature or humidity may change the state of an electrostatic latent image formed on the photosensitive member to change the density characteristic of an image provided in the next development step.

2) The environmental temperature or humidity may change the charged state of toner to change the density characteristic of an image provided in the next development step.

3) The environmental temperature or humidity may change the rate of transfer from a photosensitive drum to the intermediate transfer member to change the density characteristic of an image formed on the intermediate transfer member.

4) The environmental temperature or humidity may change the rate of transfer from the intermediate transfer member to a sheet to change the density characteristic of an image formed on the sheet.

5) The environmental temperature may change a fixation temperature and thus the dissolution level of toner during fixation to change coloring.

As described in 1) to 5), a variation in environmental temperature or humidity may vary the density characteristic in a plurality of steps of the electrophotographic process. That is, the calibration process can be considered to achieve constant color expression in spite of a variation in environmental temperature or humidity.

Now, a common calibration process will be described in further detail.

The LBP has the intermediate transfer member that forms a color image on a sheet which image is to be transferred. In the calibration process, a plurality of fine areas with a predetermined density, such as those called patch patterns, are formed on the intermediate transfer body. Then, a density sensor is used to read the actual densities of the individual patch patterns to determine actual characteristics corresponding to the relationship between specified densities and the actual densities. The patch patterns formed on the intermediate transfer member are deleted after they have been read by the density sensor.

FIG. 3 is a diagram showing an example of a patch pattern formed on the intermediate transfer member. In this figure, reference numeral 301 denotes the entire patch pattern, and reference numerals 311, 312, 313, and 314 denote rectangular areas (patches) of density 20%, 40%, 60%, and 80%, respectively. These densities are, for example, numerical values in a density expression using dither which values correspond to pixels on which toner is placed.

FIG. 4 is a view schematically showing how patch patterns formed on the intermediate transfer member are read. In the figure, reference numeral 401 denotes the intermediate transfer member. The patch pattern 301 is formed on the intermediate transfer member 401. A density sensor 402 reads the different densities of the patches. A printer controller 403 is connected to the density sensor 402.

When the patch pattern 301 is thus formed and read, it exhibits a characteristic such as the one shown in FIG. 5A. In FIG. 5A, the four points shown as black circles indicate densities read from the 20%, 40%, 60%, and 80% patches, respectively, using the density sensor 402. The whole characteristic is calculated from these four points. The calculated characteristic curve is shown as a solid line in FIG. 5A. On the other hand, the linear characteristic shown by a broken line in FIG. 5A is assumed to be realized by corrections (this characteristic will hereinafter referred to as an ideal characteristic). Then, a corrected characteristic such as the one shown by a solid line in FIG. 5B can be determined.

Specifically, input density levels having density values corresponding to the ideal characteristic shown by the broken line in FIG. 5A are determined from the density characteristic curve shown as the solid line in FIG. 5A. These levels are represented as a characteristic curve such as the one shown in FIG. 5B, which curve indicates a density converted characteristic.

When the input densities are utilized after being converted in accordance with the density converted characteristic shown in FIG. 5B, output densities corresponding to the input density levels exhibit an ideal characteristic as shown in FIG. 5C. Furthermore, it is assumed that a color is to be expressed in YMCK. Then, once the relevant density levels are determined, the target color can be expressed using the densities converted in accordance with the density converted characteristic shown in FIG. 5B.

In the above description, the patch pattern with the four densities, 20%, 40%, 60%, and 80%, are used. However, the densities may be set in smaller increments. However, setting the densities in smaller increments increases the amount of information to be processed and thus the number of patch readings. This increases the time required for the whole calibration process.

Now, timing for calibration will be described.

As described above, the gradation characteristic of electrophotography tends to vary with the environmental temperature or humidity. On the other hand, the calibration process is a function to stably reproduce the colors in spite of a variation in environmental conditions. Accordingly, if the environmental temperature or humidity varies, a series of calibration operations must be performed over again, including the formation and reading of the patch pattern 301, the calculation of an actual density characteristic (the characteristic shown by the solid line in FIG. 5A), and the creation of a density converted characteristic (the characteristic shown by the solid line in FIG. 5B). In general, the calibration is carried out if the internal temperature of the printing apparatus varies upon power-on or owing to continuous printing. The calibration is also carried out when the number of sheets printed is counted and reaches a specified value or depending on the time elapsing after power-on.

As described above, the calibration process is essential in stably reproducing the colors. However, the calibration process uses a method of forming patches on the intermediate transfer member and measuring the densities of the patches using the density sensor. Thus disadvantageously, it is impossible to execute a printing process, the original purpose of the LBP, during the calibration process.

SUMMARY OF THE INVENTION

The present invention is provided in view of these problems. It is an object of the present invention to provide a printing system and a printing method that avoids interrupting a printing process in order to execute a calibration process, while stably reproducing colors.

To accomplish this object, the present invention provides a printing system having a plurality of printing apparatuses connected together so as to communicate with each other, the system being characterized in that a printing apparatus different from the printing apparatus used for printing contains density converted characteristic generating means for converting output density values corresponding to density values inputted to an arbitrary printing apparatus used for printing so that the output density values exhibit an ideal characteristic.

With this arrangement, when the printing apparatus used for printing determines while executing a printing process that a calibration process must be executed on the printing apparatus, environmental information acquiring means provided in the printing apparatus acquires environmental information. Then, the printing apparatus transmits the environmental information acquired by the environmental information acquiring means to the second printing apparatus comprising the density converted characteristic generating means. Upon receiving the environmental information, the second printing apparatus uses the density converted characteristic generating means to generate density converted characteristic information. The second printing apparatus then transmits the information to the printing apparatus used for printing. The printing apparatus used for printing receives the density converted characteristic information and subsequently executes a printing process while converting the densities on the basis of this density converted characteristic information.

Alternatively, the printing system according to the present invention can be configured as follows. Environmental-condition setting means for actively realizing arbitrary environmental conditions is provided in a printing apparatus which is different from the one used for printing and which comprises the density converted characteristic generating means. When the printing apparatus used for printing transmits environmental information to the second printing apparatus, the latter causes the environmental-condition setting means to function to realize this environment on the basis of the transmitted environmental information. Then, after the environment has been realized, the density converted characteristic generating means generates density converted characteristic information.

The present invention also provides a printing method used in a printing system comprising a first printing apparatuses used for printing, a second printing apparatus that executes a calibration process on the first printing apparatus, and a network connecting the first and second printing apparatuses together, the method being characterized by comprising a temperature sensing step of sensing a temperature of the second printing apparatus when the first printing apparatus requests a calibration process from the second printing apparatus, a temperature information providing step of comparing the temperature of the second printing apparatus acquired by the temperature sensing step with a temperature of the first printing apparatus to provide temperature information indicative of the need for heating or cooling, a humidity sensing step of sensing a humidity of the second printing apparatus, a humidity information providing step of comparing the humidity of the second printing apparatus acquired by the humidity sensing step with a humidity of the first printing apparatus to provide humidity information indicative of the need for humidification or dehumidification, a step of executing a process on the basis of information obtained from the temperature information providing step and the humidity information providing step, then reading the density of each patch of a patch pattern in the second printing apparatus, and generating density converted characteristic information on the basis of density results which information is required to obtain a target density characteristic.

This method is also characterized by comprising an environmental-condition setting step of actively realizing arbitrary environmental conditions during a calibration process executed by the second printing apparatus.

Thus according to the present invention, in the printing system having the plurality of printing apparatuses connected together so as to communicate with each other, the density converted characteristic generating means for converting output density values corresponding to density values inputted to the arbitrary printing apparatus used for printing so that the output density values exhibit an ideal characteristics provided in the printing apparatus different from the printing apparatus used for printing. Accordingly, if the environmental conditions required to execute a calibration process are met, the printing apparatus causes the different printing apparatus to execute a calibration process on the basis of the environmental information. This eliminates the need to interrupt the printing process in order to generate density conversion characteristic information as in the case of the prior art. This in turn prevents an increase in the time required to achieve printing.

Moreover, the printing apparatus executing a calibration process is provided with the heating, cooling, humidifying, and dehumidifying means for enabling the reproduction of the environmental conditions for the printing apparatus requesting the execution of the calibration process. It is thus possible to generate density converted characteristic information almost as accurate as that generated in the printing apparatus requesting the execution of the calibration process.

The above and other objects, effects, features and advantages of the present invention will become more apparent from the following description of embodiments thereof taken in conjunction with the accompanying drawings.

BRIEF DESCRIPTION OF THE DRAWINGS

FIG. 2 is a flow chart showing the relationship of FIG. 2A and 2B;

FIG. 5A is a graph showing an input density level and an actually measured density (plot), a characteristic curve for the whole input density level and output density which curve has been determined in an interpolative manner (solid line), and an ideal characteristic (broken line), FIG. 5B shows a density converted characteristic curve indicating density values to be actually specified for the input density, and FIG. 5C is a characteristic diagram of the output density corresponding to the input which diagram is obtained by converting the input density values in accordance with the density converted characteristic shown in FIG. 5B.

DETAILED DESCRIPTION OF PREFERRED EMBODIMENTS

Embodiments of the present invention will be described below with reference to the drawings.

Figure 1:
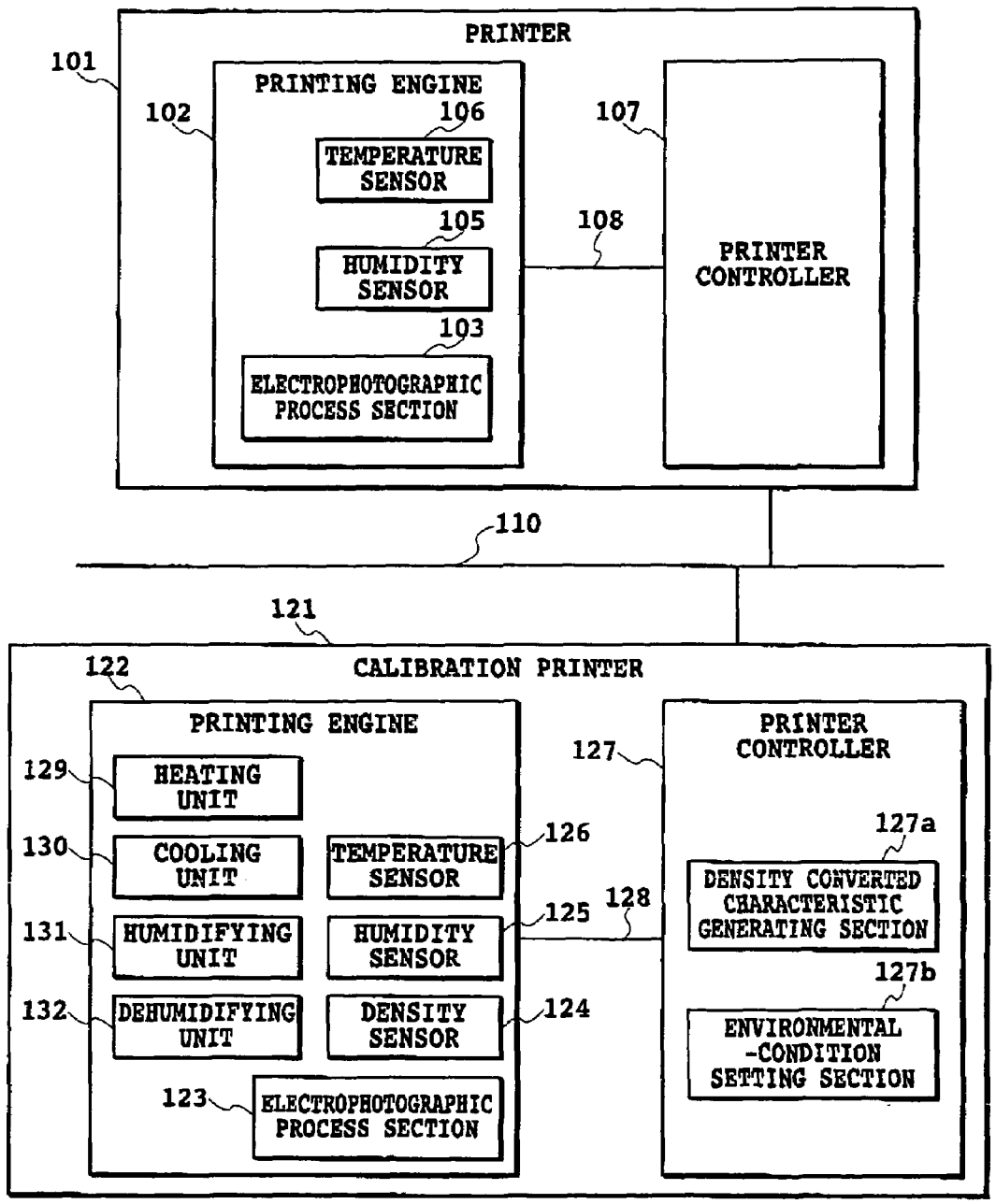
FIG. 1 is a block diagram illustrating an embodiment of a printing system according to the present invention.

FIG. 1 is a block diagram illustrating an embodiment of a printing system according to the present invention. In this figure, reference numeral 101 denotes a printer acting as a printing apparatus used for printing, particularly an LBP to which an electrophotographic process is applied. Reference numeral 102 denotes a printing engine provided in the printer 101 to form a permanent visible image on a sheet. The printing engine 102 is composed of an electrophotographic process section 103 consisting of a photosensitive drum on which an electrostatic latent image is formed, an intermediate transfer member, a fixing device, a laser unit, and the like; a humidity sensor 105 that senses the humidity of the printer 101; and a temperature sensor 106 that senses the temperature of the printer 101.

Furthermore, the printing engine 102 contains a control section (not shown in the drawings) that controls operations of the printing engine 102. The printing engine has a function to transmit temperature information sensed by the temperature sensor 106 and humidity information sensed by the humidity sensor 105, to a printer controller 107 via a communication path 108 provided in the printing apparatus and described later (hereinafter referred to as an internal communication path).

Reference numeral 107 denotes the printer controller which controls operations of the whole printer 101 and which is composed of microprocessor system including a ROM and a RAM. Reference numeral 108 denotes an internal communication path that connects the printing engine 102 and the printer controller 107 together.

The printer controller 107 is configured to acquire temperature information by transferring information on a digital image to be printed, to the printing engine 102 through the internal communication path 108 or issuing an acquisition command to the printing engine 102 to acquire information on temperature sensed by the temperature sensor 106. The printer controller 107 is also configured to acquire humidity information by issuing an acquisition command to the printing engine 102 to acquire information on humidity sensed by the humidity sensor 105.

Reference numeral 121 denotes another printer that executes a calibration process, that is, a printer acting as a printer apparatus and differing from the printing apparatus used for printing. Specifically, this printer is an LBP to which an electrophotograhic process is applied. Reference numeral 122 denotes a printing engine provided in the printer 121 to form a permanent visible image on a sheet.

The printing engine 122 is composed of an electrophotographic process section 123 consisting of a photosensitive drum on which an electrostatic latent image is formed, an intermediate transfer member, a fixing device, a laser unit, and the like; a density sensor 124 that reads the density of a patch pattern formed on the intermediate transfer member; a humidity sensor 125 that senses the humidity of the printer 121; a temperature sensor 126 that senses the temperature in the printer 121, a heating unit 129 that increases the temperature in the printer 121, a cooling unit 130 that reduces the temperature in the printer 121, a humidifying unit 131 that increases the humidity in the printer 121, a dehumidifying unit 132 that reduces the humidity in the printer 121.

Furthermore, the printing engine 122 contains a control section (not shown in the drawings) that controls operations of the printing engine 122. The printing engine has a function to transmit information on temperature information sensed by the temperature sensor 126, humidity information sensed by the humidity sensor 125, and density information sensed by the density sensor 124, to a printer controller 127 via a communication path 128 described later Reference numeral 127 denotes the printer controller which controls operations of the whole printer 101 and which is composed of microprocessor system including a ROM and a RAM. The printer controller 127 comprises a temperature converted characteristic generating section 127a and an environmental-condition setting section 127b. Reference numeral 128 denotes an internal communication path that connects the printing engine 122 and the printer controller 127 together.

The printer controller 127 transfers information on a digital image to be printed, to the printing engine 122 through the internal communication path 128.

Furthermore, the printer controller 127 is configured to acquire temperature information by issuing a command to the printing engine 122 to acquire information on temperature sensed by the temperature sensor 126. The printer controller 127 is also configured to acquire humidity information by issuing a command to the printing engine 122 to acquire information on humidity sensed by the humidity sensor 125. Moreover, the printer controller 127 is configured to issue a command to the printing engine 122 to sequentially acquire density information obtained by forming a patch pattern on the intermediate transfer member (not shown in the drawings), provided in the electrophotographic process section 123, and then using the density sensor 124 to read the density of the patch pattern.

The printer controller 127 is configured to issue a command to the printer engine 122 through the internal communication path 128 to increase the temperature in the printer 121 to a predetermined value. The control section (not shown in the drawings) in the printing engine is configured to cause the heating unit 129 to function to increase the temperature in the printer 121 to a predetermined value. The control section is also configured to transmit a command execution status to the printer controller 127 through the internal communication path 128 so that the printer controller 127 acquires command execution status information.

Furthermore, the printer controller 127 is configured to issue a command to the printer engine 122 through the internal communication path 128 to reduce the temperature in the printer 121 to a predetermined value. The control section (not shown in the drawings) in the printing engine is configured to cause the cooling unit 130 to function to reduce the temperature in the printer 121 to a predetermined value. The control section is also configured to transmit a command execution status to the printer controller 127 through the internal communication path 128 so that the printer controller 127 acquires command execution status information.

Moreover, the printer controller 127 is configured to issue a command to the printer engine 122 through the internal communication path 128 to increase the humidity in the printer 121 to a predetermined value. The control section (not shown in the drawings) in the printing engine is configured to cause the humidifying unit 131 to function to increase the temperature in the printer 121 to a predetermined value. The control section is also configured to transmit a command execution status to the printer controller 127 through the internal communication path 128 so that the printer controller 127 acquires command execution status information.

Furthermore, the printer controller 127 is configured to issue a command to the printer engine 122 through the internal communication path 128 to reduce the humidity in the printer 121 to a predetermined value. The control section (not shown in the drawings) in the printing engine is configured to cause the dehumidifying unit 132 to function to reduce the humidity in the printer 121 to a predetermined value. The control section is also configured to transmit a command execution status to the printer controller 127 through the internal communication path 128 so that the printer controller 127 acquires command execution status information.

Reference numeral 110 denotes a network. The printer 101 and the printer 121 are connected to the network 110.

As described above, the printing system according to the embodiment of the present invention has the plurality of printers connected together so as to communicate with each other. Furthermore, the density converted characteristic generating section 127a that converts output density values corresponding to density values inputted to the arbitrary printer 101 used for printing so that the output density values exhibit an ideal characteristic is provided in the printer 121 different from the printer 101 used for printing. Specifically, the printing system is composed of the printer (printing apparatus) 101 used for printing, the printer 121 that executes a calibration process on the printer 101, and the network 110 that connects the printers 101 and 121 together. The printer 121 comprises the printing engine 122 including the temperature sensor 126, the humidity sensor 125, and the density sensor 124; and the printer controller (printing control section) 127 that acquires information from the sensors 124, 125, and 126 in the printing engine 122 to provide calibration processing information to the printer 101 on the basis of the information acquired. The printer controller 127 comprises the density converted characteristic generating section 127a that converts output density values corresponding to density values inputted to the printer 101 so that the output density values exhibit an ideal characteristic.

The printer controller 127 also comprises the environmental-condition setting section 127b that actively realizes arbitrary environmental conditions on the basis of information from the sensors 125 and 126 in the printing engine 122.

Figure 2A:
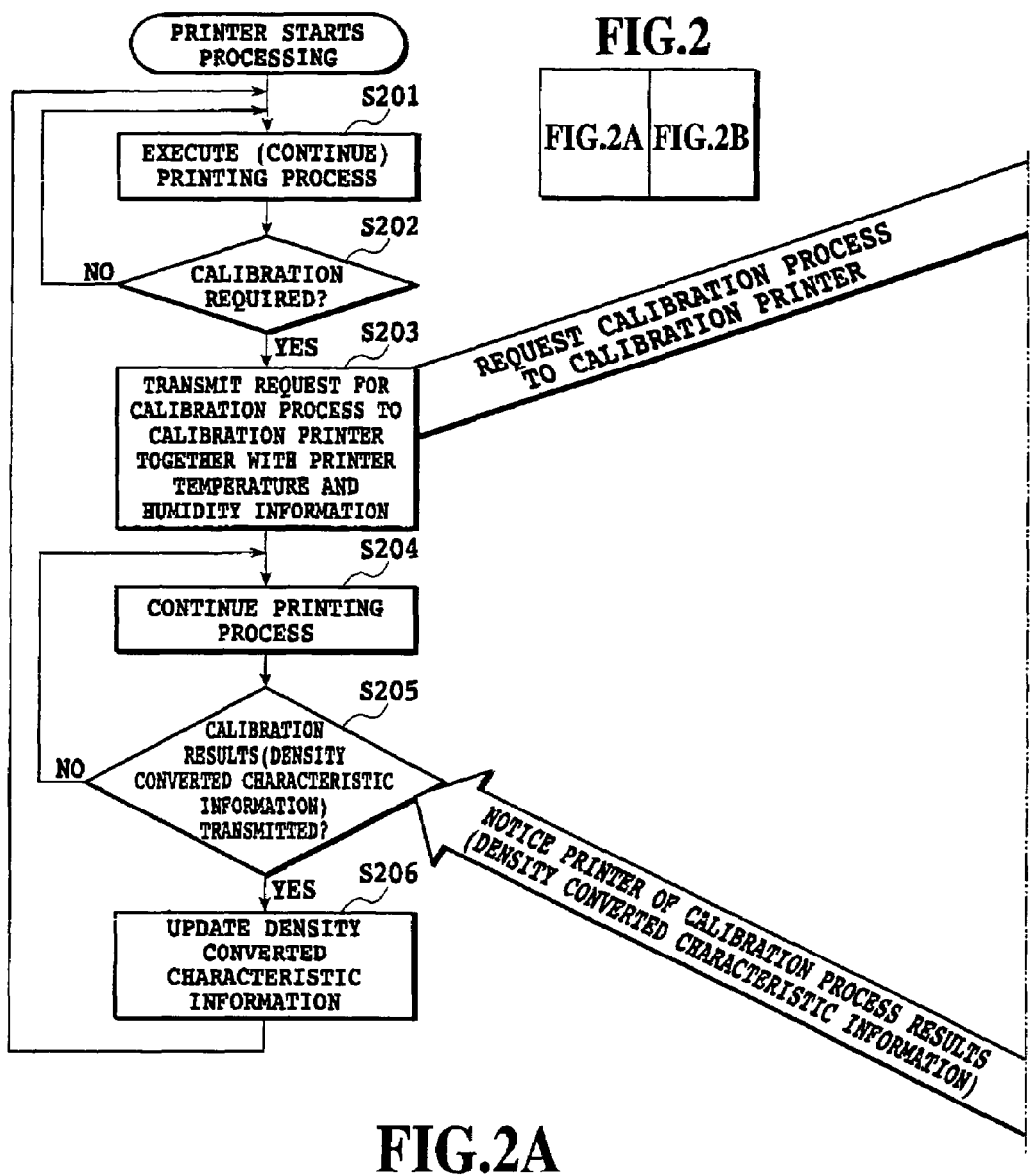
FIGS. 2A and 2B are flowcharts illustrating operations of the printing system according to the present invention.
Figure 2B:
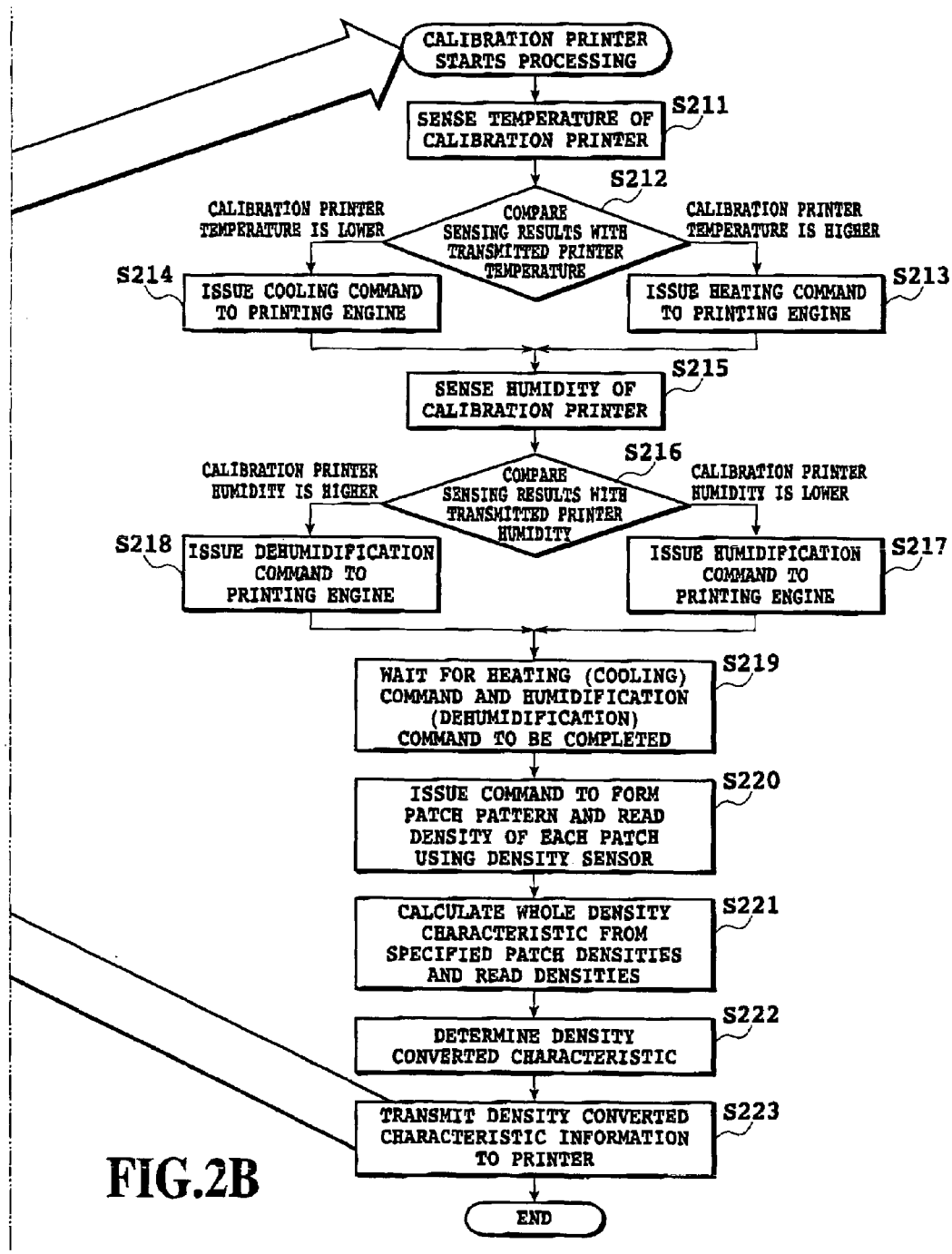
Figure 3:
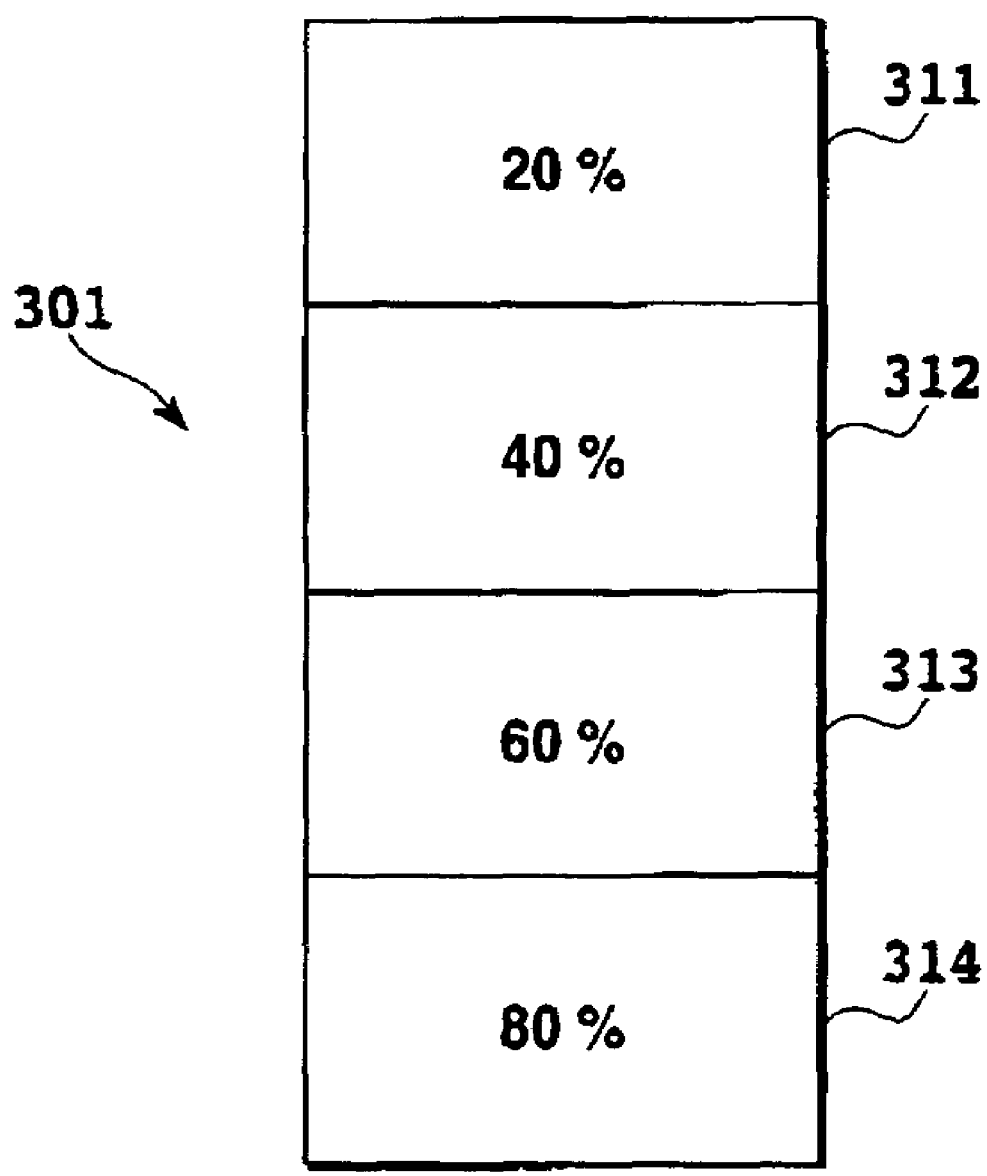
FIG. 3 is a diagram showing an example of a patch pattern formed on an intermediate transfer member.
Figure 4:
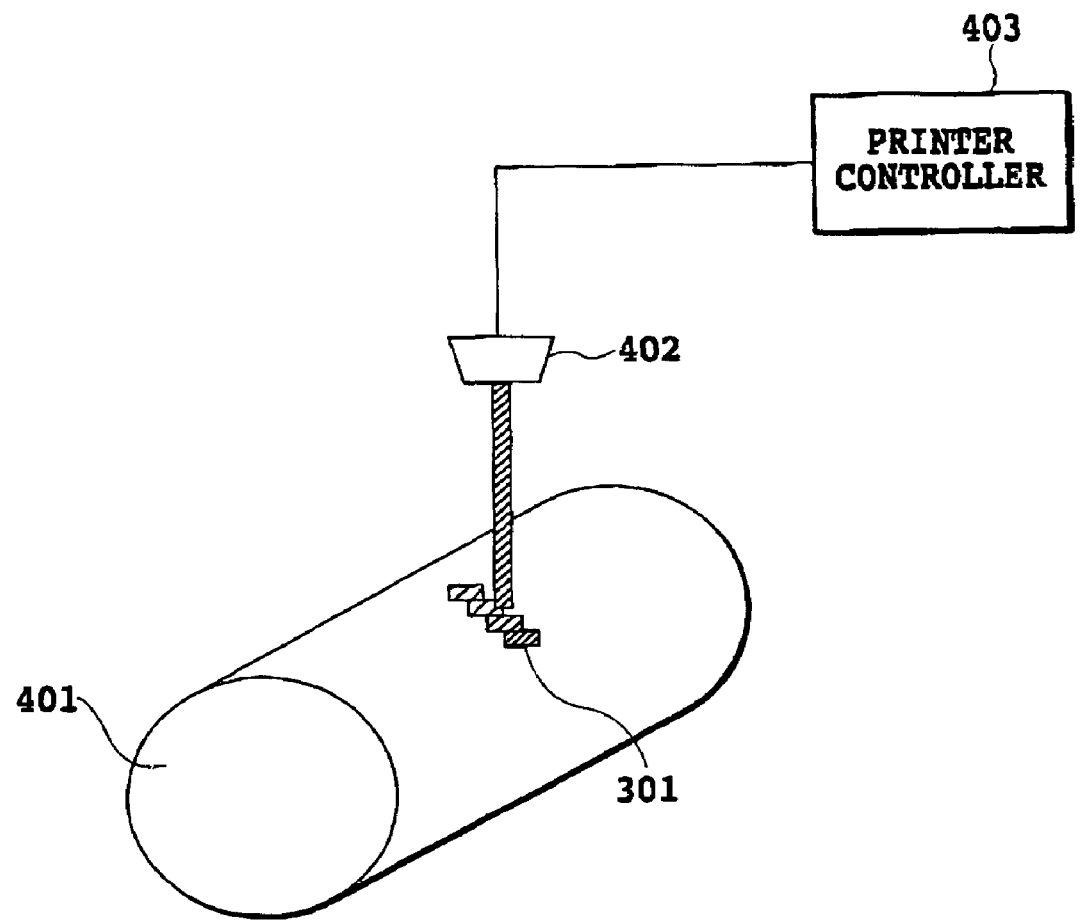
FIG. 4 is a view schematically illustrating how the patch pattern formed on the intermediate transfer member is read.
Figure 5A:
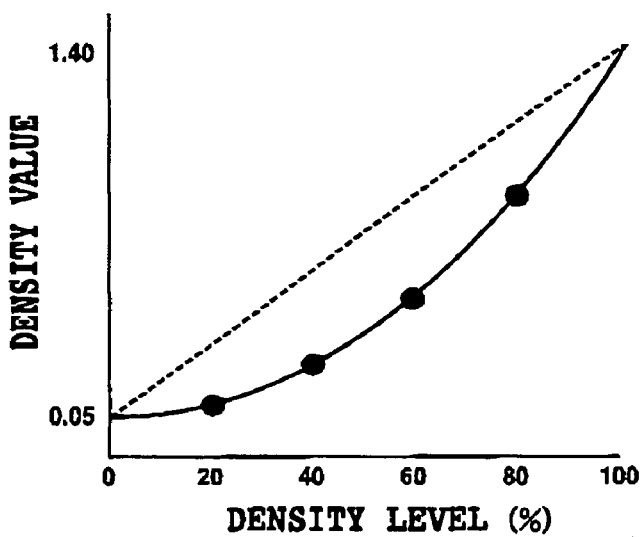
FIGS. 5A to 5C are graphs illustrating a density converted characteristic.
Figure 5B:
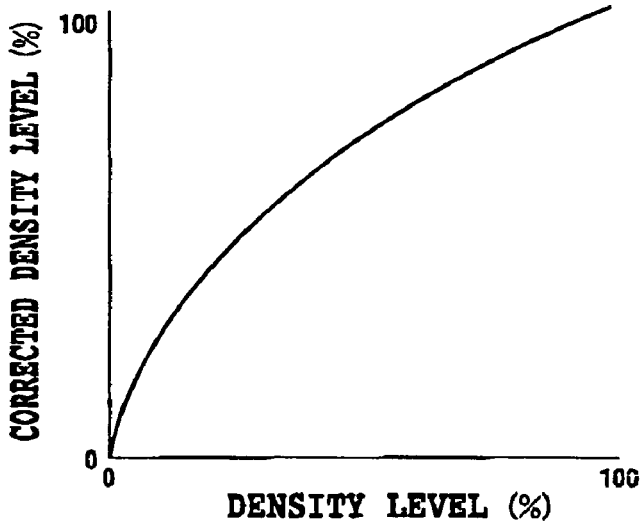
Figure 5C:
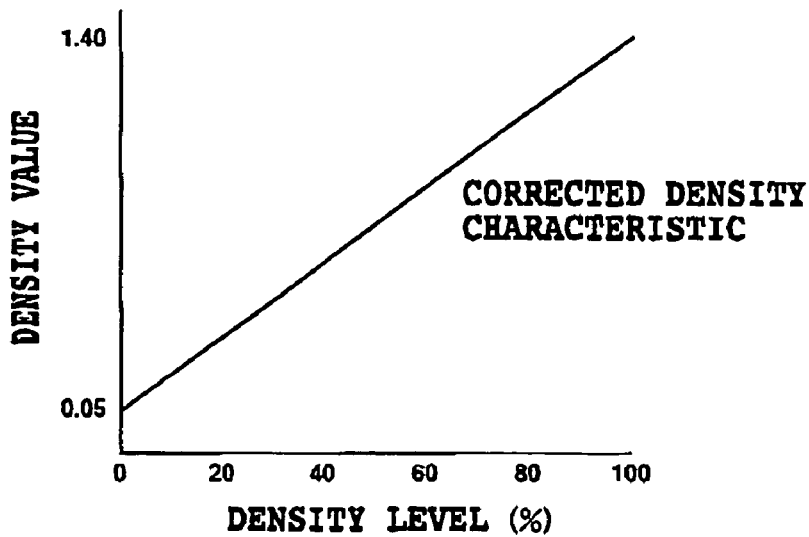

Now, with reference to the flow charts shown in FIGS. 2A and 2B, description will be given of operations of the printing system performed when a calibration process must be executed on the printer 101.

First, operations of the printer 101 will be described.

The printer 101 executes a printing process (S201). During this process, the printer 101 checks whether or not a calibration process must be executed on it (S202). The calibration process comprises acquiring temperature information by issuing an acquisition command to the printing engine 102 to acquire information on the temperature sensed by the temperature sensor 106 in the printing engine 102, and then comparing this temperature information with a previous temperature stored in the printer controller 107 to determine whether or not a difference in temperature exceeds a threshold, or executing a similar process for humidity.

Then, if it is determined at step S202 that the calibration process is not required, the process proceeds to step 201 to continue the printing process. On the other hand, if it is determined at step S202 that the calibration process is required, the printer controller 107 requests the calibration printer 121 to execute a calibration process, that is, to reproduce density converted characteristic information, on the basis of the temperature and humidity information obtained in step S202 (S203).

Then, the printer 101 continues the printing process (S204). During the printing process, the printer 101 checks whether or not the calibration printer 121 transmitted the results of the calibration process at an appropriate time, for example, when the processing of a new page is started (S205). If the results have not been transmitted, the processing process is continued (S204).

Then, if the results of the calibration process, that is, density converted characteristic information, has been transmitted by the calibration printer 121 in step S205, then previous density converted characteristic information is updated (S206). If the density converted characteristic information is changed when the processing of the new page is started, then for example, the unchanged density converted characteristic information is used to process a certain number of pages on which the same image is being printed. Then, the changed density converted characteristic information is used for the remaining pages. As a result, even though the same image is being printed, the reproduced colors may be changed when the density converted characteristic information is changed. To prevent this, the density converted characteristic information may be switched when the job received and continuously processed by the printer 101 is switched instead of immediately changing, upon reception, the density converted characteristic information transmitted by the calibration printer 121. (Since the job has been switched, the switched density converted characteristic information is used for a different image).

Now, operations of the calibration printer 121 will be described.

In step S203, the printer 101 requests a calibration process from the calibration printer 121. Then, the calibration printer 121 senses the temperature of the calibration printer 121 (S211). In this process, to measure the temperature of the calibration printer 121, the printer controller 127 acquires temperature information by issuing an acquisition command to the printing engine 122 to acquire information on the temperature sensed by the temperature sensor 126 in the printing engine 122.

Then, the temperature of the calibration printer 121 acquired in step 211 is compared with the temperature of the printer 101 transmitted together with a notice of the request for a calibration process (S212). If the temperature of the printer 101 is higher, a heating command is issued to the printing engine 122 together with temperature information indicative of the need for heating (S213). In contrast, if the temperature of the printer 101 is lower, a cooling command is issued to the printing engine 122 together with temperature information indicative of the need for cooling (S214).

Then, the calibration printer 121 senses the humidity of the calibration printer 121 (S215). In this process, to measure the humidity of the calibration printer 121, the printer controller 127 acquires temperature information by issuing an acquisition command to the printing engine 122 to acquire information on the humidity sensed by the humidity sensor 125 in the printing engine 122.

Then, the humidity of the calibration printer 121 acquired in step 215 is compared with the temperature of the printer 101 transmitted together with the notice of the request for a calibration process (S216). If the humidity of the printer 101 is lower, a humidification command is issued to the printing engine 122 together with humidity information indicative of the need for humidification (S217). In contrast, if the humidity of the printer 101 is higher, a dehumidification command is issued to the printing engine 122 together with humidity information indicative of the need for dehumidification (S218).

Then, the process waits for the heating, cooling, humidification, or dehumidification command issued in step S213, S214, S217, or S218, respectively, to be completed (S219). After the command has been completed, the printer controller 127 issues a command to the printing engine 122 to execute a process of forming a patch pattern and reading the density of each patch using the density sensor (S220).

Upon receiving the measurements of the densities of the patches, the printer controller 127 calculates the whole density characteristic from the discrete measurements of the densities (S221). Then, density converted characteristic information is generated in order to obtain the target density characteristic (S222). This information is transmitted to the printer 101 (S223). The printer 101 used for printing is noticed of the results of the calibration process (density converted characteristic information).

Thus, the printing method according to the present embodiment is used in a printing system comprising a first printing apparatuses used for printing, a second printing apparatus that executes a calibration process on the first printing apparatus, and a network connecting the first and second printing apparatuses together. The printing method comprises a temperature sensing step of sensing a temperature of the second printing apparatus when the first printing apparatus requests a calibration process from the second printing apparatus, a temperature information providing step of comparing the temperature of the second printing apparatus acquired by the temperature sensing step with a temperature of the first printing apparatus to provide temperature information indicative of the need for heating or cooling, a humidity sensing step of sensing a humidity of the second printing apparatus, a humidity information providing step of comparing the humidity of the second printing apparatus acquired by the humidity sensing step with a humidity of the first printing apparatus to provide humidity information indicative of the need for humidification or dehumidification, a step of executing a process on the basis of information obtained from the temperature information providing step and the humidity information providing step, then reading the density of each patch of a patch pattern in the second printing apparatus, and generating density converted characteristic information on the basis of density results which information is required to obtain a target density characteristic. The method also comprises an environmental-condition setting step of actively realizing arbitrary environmental conditions during processing in the second printer.

In the description of the arrangement in FIG. 1, the printer 101 is not configured to execute a calibration process (forming a patch pattern on the intermediate transfer member, reading the density of the patch pattern, and generating density converted characteristic information from the results of the reading). However, the printer 101 may have an arrangement for a calibration process. In this case, when the printer 101 must be calibrated, it checks the number of print jobs (or the amount of data) requested by one or more host computers connected to the printer 101 via the network 110. If the number of print jobs is equal to or smaller than a predetermined value, the printer 101 processes these jobs and then uses the internal calibration process arrangement to execute a calibration process to create a density converted characteristic. On the other hand, if the number of print jobs exceeds the predetermined value, the printer 101 cannot execute any calibration processes while processing these jobs. Accordingly, the printer is configured to request calibration from the printer 121 in this case.

FIG. 1 shows that the two printers, that is, the printer 101 and the different printer 121 that executes a calibration process, are connected to the network 110. However, it is contemplated that the network may include a large number of printers.

In this case, it is assumed that the printer 101 requests a calibration process from a printer which is of the same type as that of the printer 101, which have temperature and humidity conditions most similar to those of the printer 101, and which is not executing a printing process when the printer 101 requires density converted characteristic information. Then, this printer can generate density converted characteristic information optimum for the printer 101.

Thus, the network 110 may be provided with a printer server (not shown in the drawings). The printer server may periodically receive information on printer type, information indicating whether or not print job printing is being executed, and environmental information (temperature and humidity) from the large number of printers. If any printer must be calibrated but cannot execute a calibration process for generating density converted characteristic information (the printer is processing consecutive print jobs), the printer may inquire of the print server about which of the printers connected to the network 110 the printer should request to create density converted characteristic information. Upon receiving this inquiry, the printer server searches information on printer type, information indicating whether or not print job printing is being executed, and environmental information which received from the large number of printers, for a printer which is not being used, which is of the same type as that of the requesting printer or has characteristics similar to those of the requesting printer, and which has an environment similar to the one of the requesting printer The printer server searches for a printer on the basis of the above information and requests a calibration process to the searched printer. Then, it is possible to generate density converted characteristic information. The printer that receives this density converted characteristic information to switch previous density converted characteristic information switches the density converted characteristic when the job is changed as described previously. Of course, it is allowable to provide each printer with the functions of the printer server instead of providing the printer server.

Other Embodiments

It goes without saying that the present invention may be achieved by supplying a system or an apparatus with a storage medium (or a recording medium) in which the program code of software that realizes the functions of the above described embodiment are recorded, and causing a computer (or CPU or MPU) of the system or apparatus to read out and execute the program code stored in the storage medium. In this case, the program code itself read out from the storage medium realizes the functions of the above described embodiment, and can be stored or written to various storage media such as a CD, MD, memory card, and MO.

It also goes without saying that the functions of the above described embodiment may be accomplished not only by executing a program code read out by a computer, but also by causing an operating system (OS) that operates on the computer to perform a part of the whole of the actual operations according to instructions of the program code.

Furthermore, it is to be understood that the program code read out from the storage medium may be written into a memory provided in an expanded board inserted in the computer, or an expanded unit connected to the computer, and then on the basis of instructions in the program code, a CPU or the like provided in the expanded board or expanded unit may actually perform a part or all of the operations according to the instructions of the program code, so as to accomplish the functions of the above described embodiment.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A printing method used in a printing system comprising a first printing apparatuses used for printing, a second printing apparatus that executes a calibration process on the first printing apparatus, and a network connecting the first and second printing apparatuses together, the method comprising:
   a step of continuing printing on the first printing apparatus when the first printing apparatus requests a calibration process of the second printing apparatus;
   a step of sensing a temperature of the second printing apparatus;
   a step of temperature information providing which comparing the temperature of the second printing apparatus acquired by the temperature sensing step with a temperature of the first printing apparatus to provide temperature information indicative of the need for heating or cooling;
   a step of sensing a humidity of the second printing apparatus; a step of humidity information providing which comparing the humidity of the second printing apparatus acquired by the humidity sensing step with a humidity of the first printing apparatus to provide humidity information indicative of the need for humidification or dehumidification;
   a step of executing a process on the basis of information obtained from the temperature information providing step and the humidity information providing step, then reading the density of each patch of a patch pattern in the second printing apparatus, and generating density converted characteristic information on the basis of density results which information is required to obtain a target density characteristic; and
   a step of transmitting the density converted characteristic information to the first printing apparatus.

2. A computer-executable computer program product stored on a computer-readable storage medium, the computer program product for executing a printing method used in a printing system comprising a first printing apparatuses used for printing, a second printing apparatus that executes a calibration process on the first printing apparatus, and a network connecting the first and second printing apparatuses together, the method comprising:
   a step of continuing printing on the first printing apparatus when the first printing apparatus requests a calibration process to the second printing apparatus;
   a step of sensing a temperature of the second printing apparatus;
   a step of temperature information providing which comparing the temperature of the second printing apparatus acquired by the temperature sensing step with a temperature of the first printing apparatus to provide temperature information indicative of the need for heating or cooling;
   a step of sensing a humidity of the second printing apparatus;
   a step of humidity information providing which comparing the humidity of the second printing apparatus acquired by the humidity sensing step with a humidity of the first printing apparatus to provide humidity information indicative of the need for humidification or dehumidification;
   a step of executing a process on the basis of information obtained from the temperature information providing step and the humidity information providing step, then reading the density of each patch of a patch pattern in the second printing apparatus and generating density converted characteristic information on the basis of density results which information is required to obtain a target density characteristic; and
   a step of transmitting the density converted characteristic information to the first printing apparatus.

* * * * *

UNITED STATES PATENT AND TRADEMARK OFFICE
CERTIFICATE OF CORRECTION

PATENT NO.         : 7,403,303 B2
APPLICATION NO. : 10/777050
DATED                 : July 22, 2008
INVENTOR(S)       : Naohiro Yoshikawa It is certified that error appears in the above-identified patent and that said Letters Patent is hereby corrected as shown below:

COLUMN 2:
        Line 13, "which" should read -- on which --.

COLUMN 11:
        Line 12, "above described" should read -- above-described --;
        Line 17, "above described" should read -- above-described --;
        Line 20, "above" should read -- above- --;
        Line 33, "above described" should read -- above-described --;
        Line 43, "apparatuses" should read -- apparatus --; and
        Line 54, "paring" should read -- pares --.

COLUMN 12:
        Line 3, "comparing" should read -- pares --;
        Line 21, "apparatuses" should read -- apparatus --;
        Line 33, "paring" should read -- pares --; and
        Line 40, "comparing" should read -- compares --.

Signed and Sealed this

Thirteenth Day of January, 2009

JON W. DUDAS
*Director of the United States Patent and Trademark Office*